(12) United States Patent
Starkey et al.

(10) Patent No.: US 12,419,454 B2
(45) Date of Patent: Sep. 23, 2025

(54) LIQUID DISPENSING APPARATUS AND METHODS

(71) Applicant: Avanelle Ventures LLC, Sheridan, WY (US)

(72) Inventors: David Phillip Starkey, Sandy, UT (US); Alyssa Marie Kuhn, Sandy, UT (US); Michael Morgan Starkey, Kent, OH (US)

(73) Assignee: Avanelle Ventures LLC, Sheridan, WY (US)

( * ) Notice: Subject to any disclaimer, the term of this patent is extended or adjusted under 35 U.S.C. 154(b) by 273 days.

(21) Appl. No.: 18/200,696

(22) Filed: May 23, 2023

(65) Prior Publication Data

US 2023/0371731 A1 Nov. 23, 2023

Related U.S. Application Data

(60) Provisional application No. 63/344,712, filed on May 23, 2022.

(51) Int. Cl.
*A47J 31/00* (2006.01)
*A47J 31/44* (2006.01)
*A47J 31/46* (2006.01)

(52) U.S. Cl.
CPC ......... *A47J 31/005* (2013.01); *A47J 31/4407* (2013.01); *A47J 31/461* (2018.08); *A47J 31/462* (2013.01)

(58) Field of Classification Search
CPC ....................................................... B65D 1/06

USPC ................. 141/2; 222/181.1, 185.1; 215/378
See application file for complete search history.

(56) References Cited

U.S. PATENT DOCUMENTS

| | | | | |
|---|---|---|---|---|
| 1,068,067 A | * | 7/1913 | McPherson, Jr. | G01F 11/267 222/38 |
| 1,305,476 A | * | 6/1919 | McCord | G01F 11/32 222/453 |
| 2,093,365 A | * | 9/1937 | Ransom | G01F 11/32 141/117 |
| 2,315,473 A | * | 3/1943 | Wolcott | G01F 11/24 141/340 |
| RE22,837 E | * | 1/1947 | Sanchis | B67D 3/02 222/501 |

(Continued)

*Primary Examiner* — Paul R Durand
*Assistant Examiner* — Michael J. Melaragno
(74) *Attorney, Agent, or Firm* — TILLMAN WRIGHT, PLLC; Chad D. Tillman

(57) ABSTRACT

A liquid dispensing apparatus includes a container including a downwardly extending wall portion that defines a bottom opening through which a liquid in the container is dispensed; a valve; and an actuator connected to the valve for controlling dispensing of the fluid from the container. The actuator is movable along an axis between a dispensing position, in which liquid from the container is dispensed, the valve being open when the actuator is in the dispensing position; and a non-dispensing position, in which liquid from the container is not dispensed, the valve being closed when the actuator is in the non-dispensing position, and the actuator in the non-dispensing position being located further from the container than when in the dispensing position. A spring biases the actuator in a direction away from the container. The liquid may be dispensed into a bottle containing a hard seltzer for flavoring of the seltzer.

13 Claims, 19 Drawing Sheets

(56) References Cited

U.S. PATENT DOCUMENTS

| | | | | |
|---|---|---|---|---|
| 2,453,080 | A * | 11/1948 | Shimp | G01F 11/32 222/453 |
| 3,089,605 | A * | 5/1963 | Buonauro | A47G 19/2255 215/377 |
| 4,372,467 | A * | 2/1983 | Pritchitt | G03G 15/104 222/518 |
| 4,717,051 | A * | 1/1988 | Leclerc | B67D 3/02 222/545 |
| 4,848,596 | A * | 7/1989 | Rudick | B67D 3/045 222/162 |
| 5,154,212 | A * | 10/1992 | Weber | A47K 5/13 222/518 |
| 5,706,985 | A * | 1/1998 | Feer | B67D 3/0032 222/469 |
| 5,964,376 | A * | 10/1999 | Kenosha | B67D 3/0032 222/525 |
| 6,131,774 | A * | 10/2000 | Thomas | G01F 11/34 222/440 |
| 6,905,038 | B2 * | 6/2005 | Lopez | B65D 1/06 220/212 |
| 6,923,345 | B1 * | 8/2005 | Laible | B67D 7/0294 222/189.09 |
| 6,945,432 | B2 * | 9/2005 | Laible | B67D 7/0294 222/518 |
| 6,945,433 | B2 * | 9/2005 | Laible | B67D 7/0294 222/481.5 |
| 7,832,599 | B2 * | 11/2010 | Laible | B67D 3/0041 222/453 |
| 7,841,492 | B2 * | 11/2010 | Laible | B67D 3/0035 222/453 |
| 7,967,172 | B2 * | 6/2011 | Albaum | B65D 47/248 222/162 |
| 7,997,434 | B2 * | 8/2011 | Benetti | B65D 51/249 215/370 |
| 8,066,157 | B2 * | 11/2011 | Laible | B67D 3/0032 222/453 |
| 8,220,665 | B2 * | 7/2012 | Laible | G01F 11/028 222/481.5 |
| 9,828,229 | B2 * | 11/2017 | Yang | B67D 3/0035 |
| 10,273,136 | B1 * | 4/2019 | Briley | B67D 3/0029 |
| 10,954,035 | B2 * | 3/2021 | Fromme | B65D 41/04 |
| 11,452,393 | B2 * | 9/2022 | Wilson | B65D 21/0228 |
| 11,827,411 | B1 * | 11/2023 | Rosas | A45F 3/16 |
| 11,912,555 | B1 * | 2/2024 | Raymus | B65D 51/249 |
| 12,275,632 | B2 * | 4/2025 | Doelman | B65D 47/244 |
| 2005/0178462 | A1 * | 8/2005 | Py | B65B 3/003 141/2 |
| 2006/0016817 | A1 * | 1/2006 | Sheppard | B65D 43/16 220/506 |
| 2008/0223478 | A1 * | 9/2008 | Hantsoo | B67D 1/0894 141/2 |
| 2009/0218370 | A1 * | 9/2009 | Michels | B67D 1/0004 222/85 |
| 2009/0261098 | A1 * | 10/2009 | Coffey | B65D 1/06 220/200 |
| 2010/0083686 | A1 * | 4/2010 | Reels | F25D 23/12 62/390 |
| 2010/0084362 | A1 * | 4/2010 | Letchinger | B65D 1/06 215/200 |
| 2010/0213215 | A1 * | 8/2010 | Laible | B67D 7/36 222/518 |
| 2012/0103926 | A1 * | 5/2012 | Ibsies | B65B 3/04 141/113 |
| 2013/0118639 | A1 * | 5/2013 | Springer | B67D 1/0894 141/2 |
| 2013/0119084 | A1 * | 5/2013 | Morayko | B05B 1/3013 222/500 |
| 2013/0228544 | A1 * | 9/2013 | Benetti | B65D 23/001 215/378 |
| 2013/0327774 | A1 * | 12/2013 | Farias, Jr. | B65D 83/06 220/288 |
| 2014/0182744 | A1 * | 7/2014 | Shaffer | E03B 9/20 222/181.1 |
| 2014/0231442 | A1 * | 8/2014 | Hill | B65D 25/2817 220/741 |
| 2014/0332495 | A1 * | 11/2014 | Choi | B65D 1/06 215/378 |
| 2016/0016704 | A1 * | 1/2016 | Garza | B65D 1/06 215/230 |
| 2016/0137393 | A1 * | 5/2016 | Hui | B65D 83/42 222/397 |
| 2018/0162582 | A1 * | 6/2018 | Deylamian | B65D 1/06 |
| 2020/0299030 | A1 * | 9/2020 | Fromme | B65D 1/06 |
| 2021/0101708 | A1 * | 4/2021 | McElfresh | B65D 1/06 |
| 2021/0204664 | A1 * | 7/2021 | Fromme | A45F 5/00 |
| 2022/0250782 | A1 * | 8/2022 | Deylamian | B65D 41/04 |
| 2023/0365306 | A1 * | 11/2023 | Sandoval | B67D 3/0051 |
| 2024/0182201 | A1 * | 6/2024 | Raymus | B65D 51/28 |
| 2025/0002223 | A1 * | 1/2025 | De Wilde | B65D 35/46 |
| 2025/0002224 | A1 * | 1/2025 | De Wilde | B65D 35/08 |
| 2025/0002226 | A1 * | 1/2025 | De Wilde | B65D 1/06 |

* cited by examiner

LIQUID DISPENSING APPARATUS AND METHODS

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

INCORPORATION OF COMPUTER PROGRAM LISTING APPENDIX

Submitted concurrently herewith via the USPTO's electronic filing system, and hereby incorporated herein by reference, is a computer program listing appendix representing computer program files including instructions, routines, and/or other contents of several computer programs. A table setting forth the name and size of files included in the computer program listing appendix is included below.

| File Name | Creation Date | File Size (bytes) |
| --- | --- | --- |
| ascify.txt | May 22, 2023 6:26:33 PM | 37,473 |
| readme.txt | May 22, 2023 6:26:25 PM | 2,890 |
| disp.txt | May 22, 2023 6:26:23 PM | 1,235,857 |

One of these files, "readme.txt", contains instructions for utilizing "ascify.txt" to convert "disp.txt" in this computer program listing into a compressed ".zip" file. The resulting compressed ".zip" file contains "dispenser.easm" which is an eDrawing file and which illustrates aspects and features in accordance with one or more preferred embodiments of the invention. This eDrawing file can be viewed using a free viewer available online from Dassault Systèmes SolidWorks Corporation using MacOS or Microsoft Windows respectively on a Mac or PC.

BACKGROUND OF THE INVENTION

The invention generally relates to liquid dispensing apparatus and methods and, in particular, to such apparatus and methods wherein a liquid—such as for example a flavoring liquid or an alcohol for human consumption—is added to a liquid that is already in a primary container, such as a bottle.

In recent years, carbonated non-beer refreshments, commonly referred to as "hard seltzers", have become widely popular. In making a homemade hard seltzer, a user adds a measured volume of alcohol to a nonalcoholic liquid, such as adding a flavored vodka to a bottle of club soda. Unfortunately, avoiding spills when pouring a measured liquid into a bottle can be tricky. One solution is to use a funnel; however, this can be cumbersome, especially if a funnel is not immediately at hand and must be located. The funnel also must be cleaned after use, which is in addition to cleaning the apparatus used to measure out the desired amount of the liquid to be added to the bottle.

In view of the foregoing, it is believed that a need exists for improvement in dispensing apparatus and methods, especially when adding a measured liquid to a container such as a bottle. This, and other needs, are addressed by one or more aspects of the invention.

SUMMARY OF THE INVENTION

The invention includes many aspects and features. Moreover, while many aspects and features relate to, and are described in, the context of hard seltzers, the invention is not limited to use only with hard seltzers and preferably is used with other beverages and even outside of the beverage context. The full utility of the invention will become apparent from the following summaries and detailed descriptions of aspects, features, and one or more embodiments of the invention.

In an aspect, a liquid dispensing apparatus comprises: a container including a downwardly extending wall portion that defines a bottom opening through which a liquid in the container is dispensed; a valve; an actuator connected to the valve for controlling dispensing of the fluid from the container, the actuator being movable along an axis between a dispensing position, in which liquid from the container is dispensed, the valve being fully open when the actuator is in the dispensing position, and a non-dispensing position, in which liquid from the container is not dispensed, the valve being closed when the actuator is in the non-dispensing position, and the actuator in the non-dispensing position being located further from the container than when in the dispensing position; and a spring biasing the actuator in a direction away from the container for biasing the actuator into the non-dispensing position in which the valve is closed.

In a feature, the actuator is movable along the axis between a plurality of dispensing positions, in each of which the valve is at least partially open for dispensing of liquid from the container.

In a feature, the apparatus further comprises an O-ring for sealing engagement between the valve and the container.

In a feature, the apparatus further comprises a lid that snap-fits or screws onto a rim of the container in covering relation to a mouth of the container so as to seal the top of the container. The lid may be retained to the container by a tether.

In a feature, the actuator comprises a funnel-shaped, downwardly extending wall portion for insertion into a mouth of a bottle in which the liquid is to be dispensed from the container. The funnel-shaped wall portion preferably defines an interior space within which is received the downwardly extending wall portion defining the bottom opening in the container; and the apparatus preferably further comprises a lid that covers a mouth of the container so as to seal the top of the container, wherein the lid includes a recess configured to receive and retain in frictional fit the funnel-shaped, downwardly extending wall portion of the actuator.

In a feature, the apparatus further comprises a locking mechanism for precluding the actuator from transitioning from the non-dispensing position toward the dispensing position. The locking mechanism preferably comprises downwardly extending tabs that engage an annular portion of the actuator and block displacement of the actuator from the non-dispensing position toward the container, wherein the actuator includes openings for accommodating passage therethrough of the tabs, and wherein the actuator is rotatable about the axis between an unlocked position in which the openings are aligned with the tabs and an unlocked position in which the tabs are aligned with the openings.

In another feature, the actuator moves radially relative to the axis.

In another feature, the actuator moves rotationally about the axis.

Another aspect comprises a liquid dispensing apparatus as disclosed herein.

Another aspect comprises an apparatus having means for dispensing a liquid, means for positioning the apparatus for filling, and means for locking the apparatus so that the liquid is not accidentally dispensed.

In another aspect, a method of using a liquid dispensing apparatus for adding a liquid from the apparatus to a second liquid in a bottle comprises the steps of: filling the liquid dispensing apparatus; positioning the liquid dispensing apparatus such that a funnel-shaped, downwardly extending portion thereof is received through a mouth of the bottle; and actuating a valve of the apparatus such that the liquid is dispensed from the apparatus into the bottle through the funnel-shaped portion.

In a feature, the method further comprises unlocking the liquid dispensing apparatus to enable actuating of the valve. Unlocking the liquid dispensing apparatus may comprise rotating an actuator such that openings defined in an annular portion of the actuator align with locking tabs that extend downwardly from a bottom of the container.

In a feature, actuating the valve of the apparatus comprising depressing a container of the apparatus toward a portion of the apparatus that abuts a rim of the bottle.

In a feature, the apparatus comprises a lid and wherein filling the liquid dispenser comprises positioning in frictional fit the funnel-shaped portion within a recess of the lid with the lid placed on a surface, whereby the liquid dispenser is free standing. In this respect, the recess of the lid is shaped and dimensioned to receive the actuator for handsfree standing of the apparatus on a surface such as a table top for pouring of a liquid into the container.

In a feature, the method further comprises, after performing said step (a), covering a container of the apparatus with a lid and storing or transporting the apparatus prior to performing said steps (b) and (c). The step of storing or transporting the apparatus may comprise placing the apparatus in a bag, purse, or backpack.

Another aspect comprises a method of using a liquid dispensing apparatus as disclosed herein.

Another aspect comprises a method of filling a liquid dispensing apparatus as disclosed herein.

Additional aspects and features are disclosed in the eDrawings of the computer program listing, which is incorporated herein by reference.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 16A is a shaded view of FIG. 16 with edges outlined.

DETAILED DESCRIPTION

Figure 1:
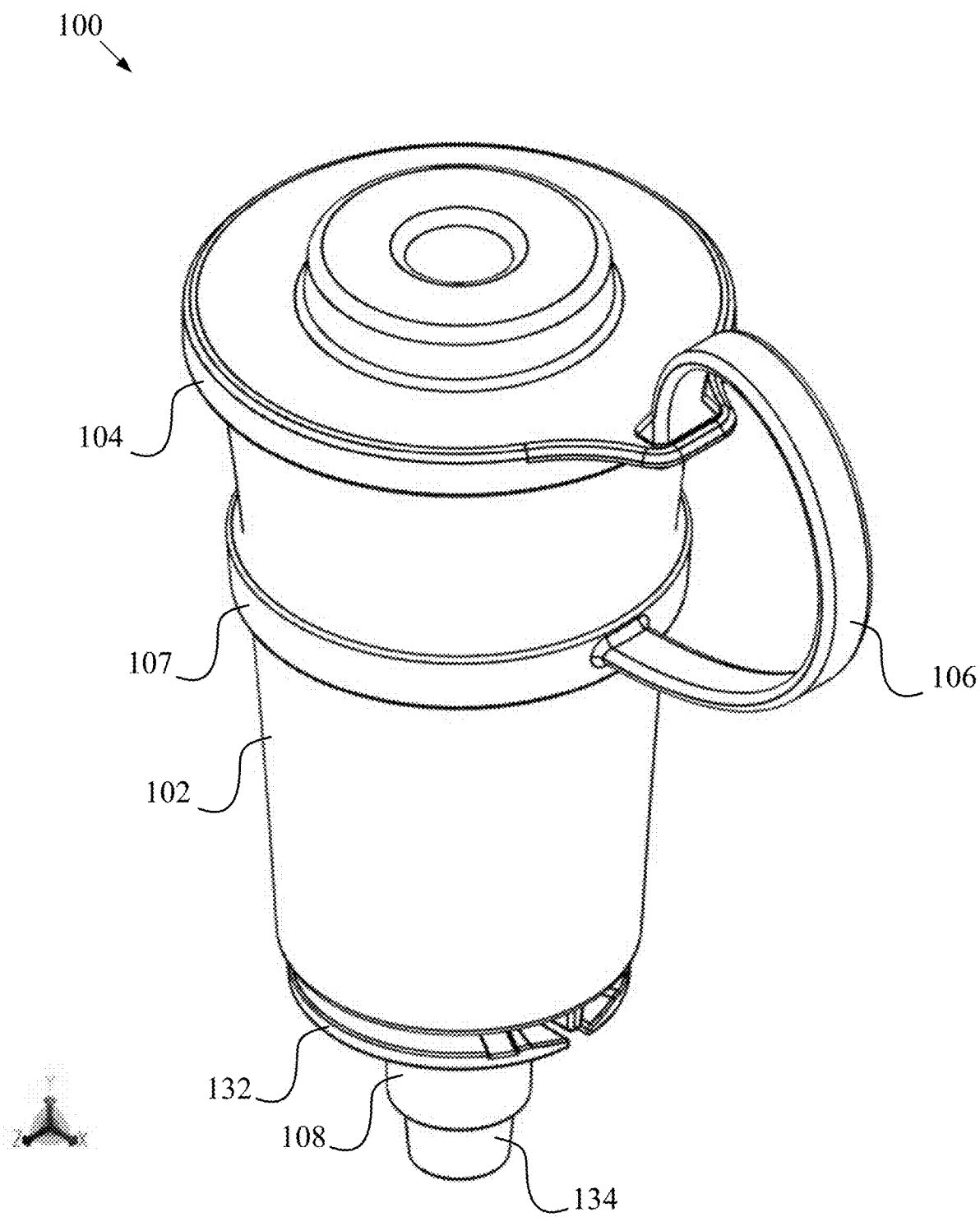
FIG. 1 is a perspective view of a liquid dispensing apparatus 100 in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 2:
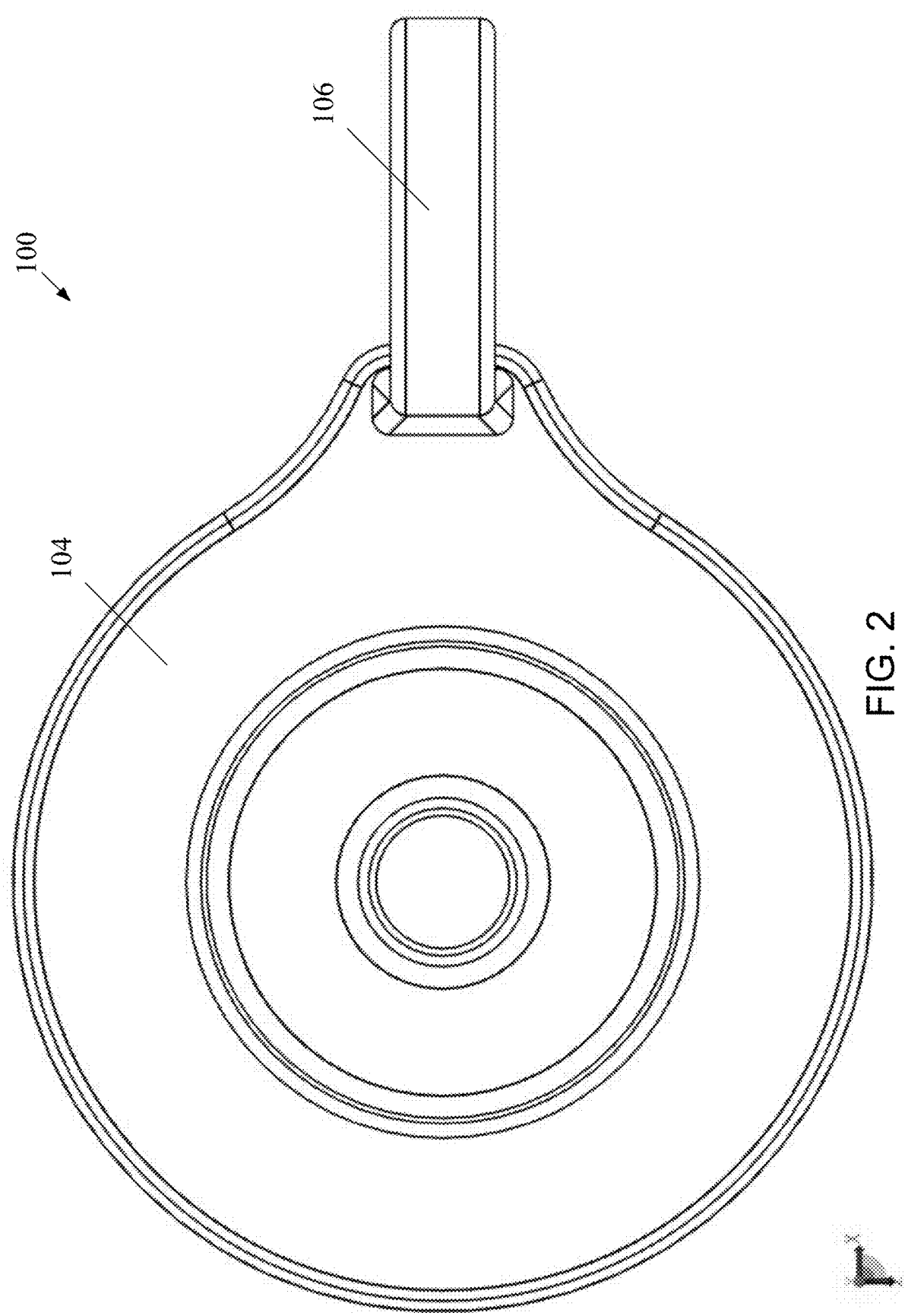
FIG. 2 is a top plan view of the dispensing apparatus 100.
Figure 3:
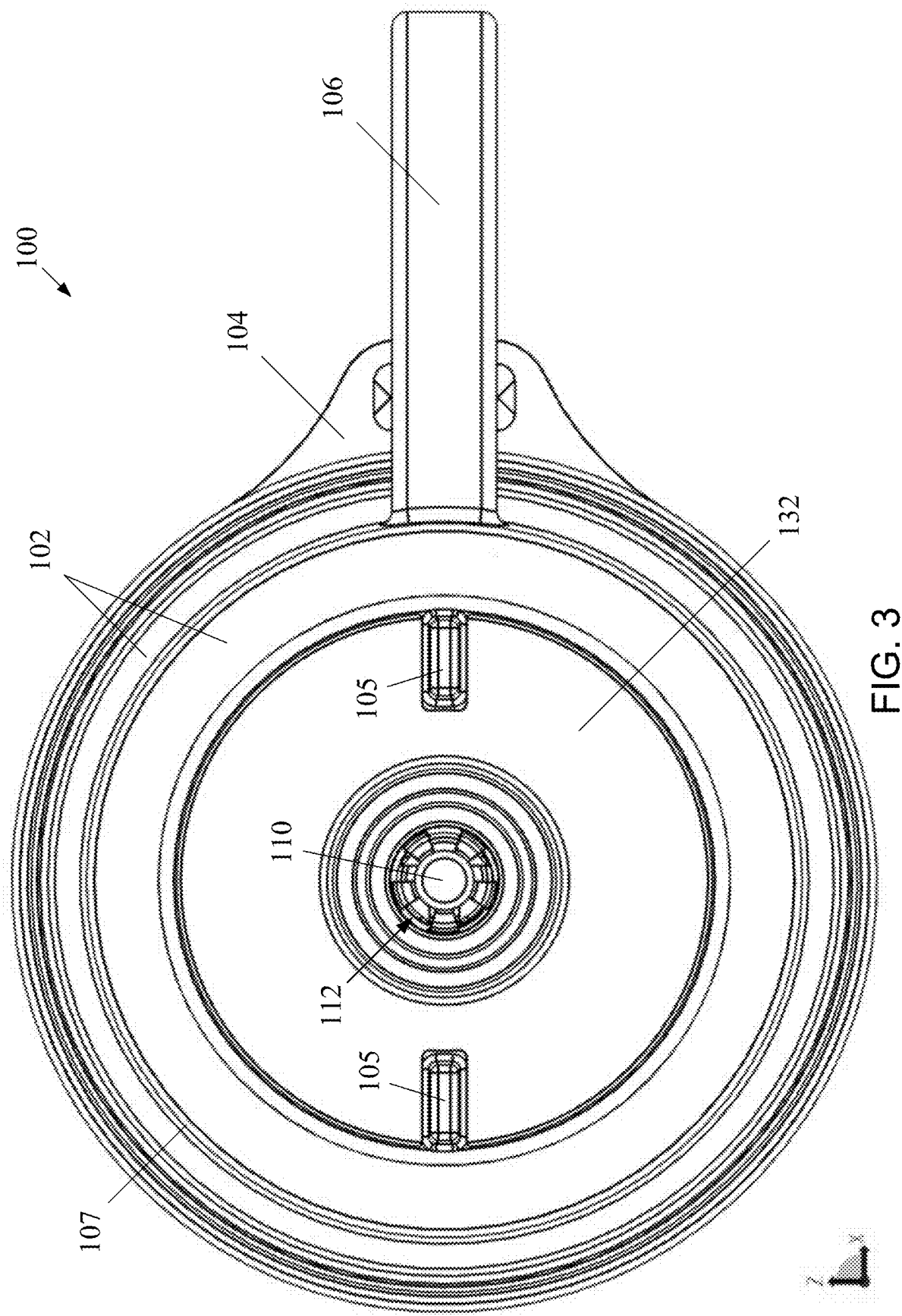
FIG. 3 is a bottom plan view of the dispensing apparatus 100.
Figure 4:
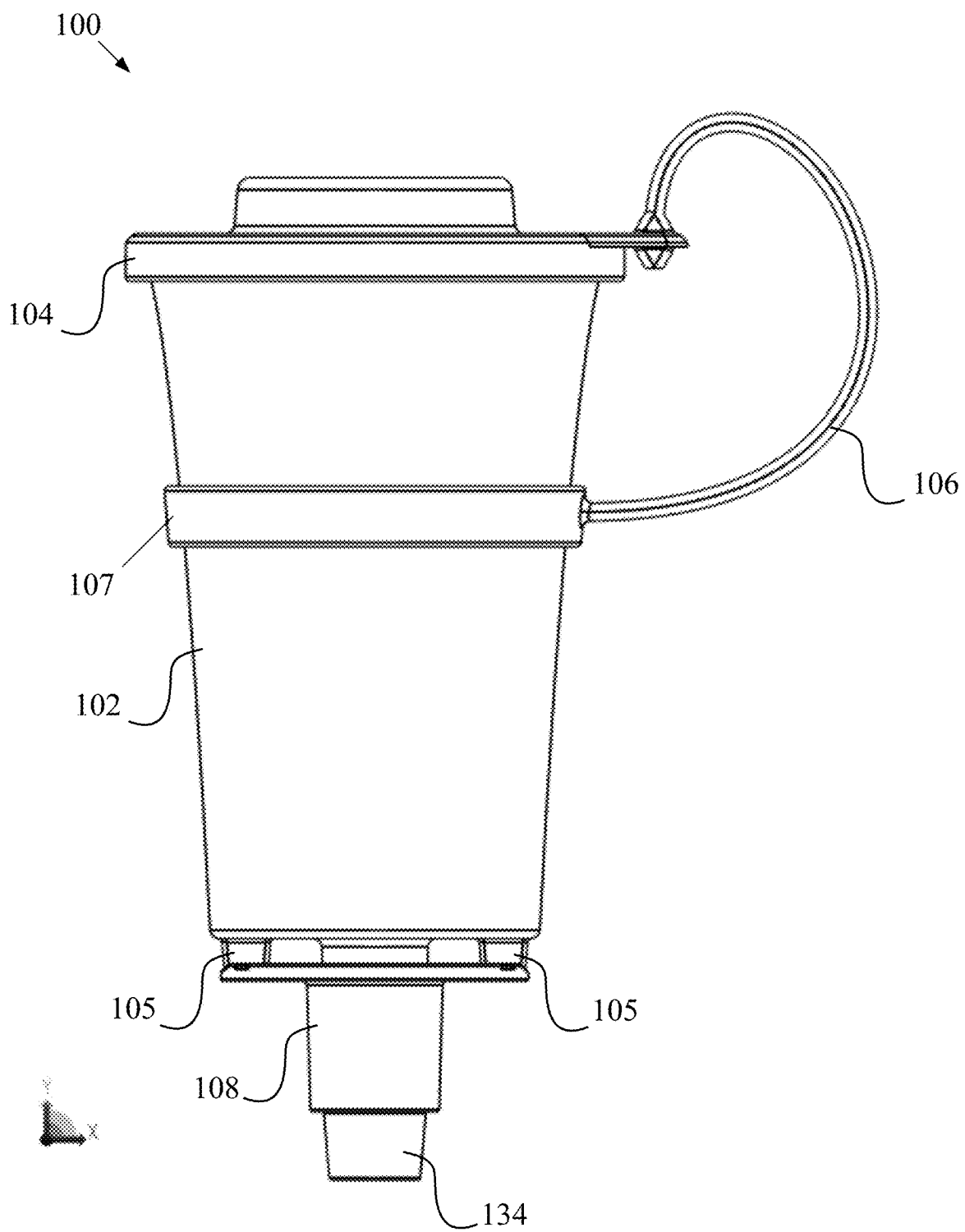
FIG. 4 is an elevational view of a first side of the dispensing apparatus 100.
Figure 5:
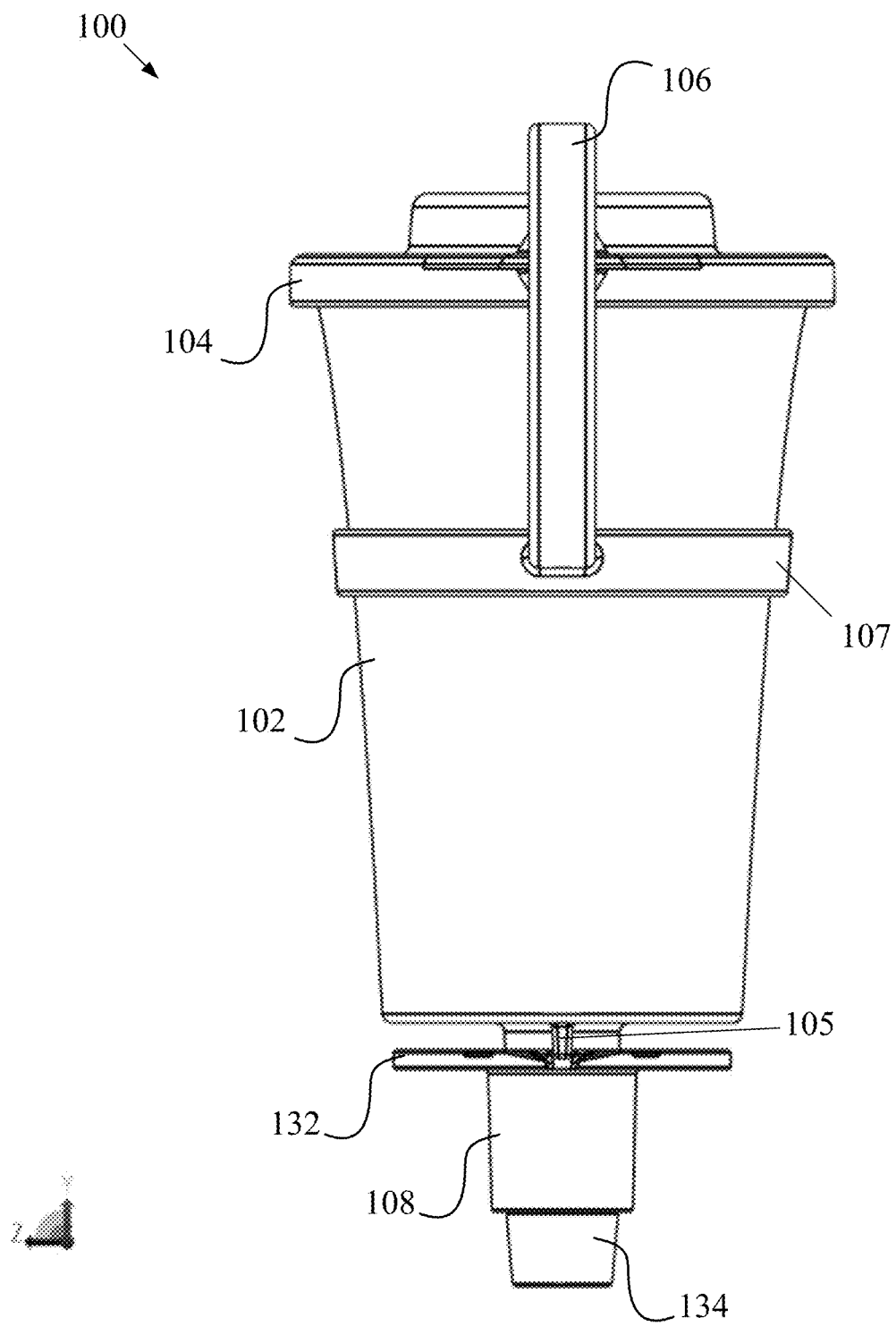
FIG. 5 is an elevational view of a rear of the dispensing apparatus 100.
Figure 6:
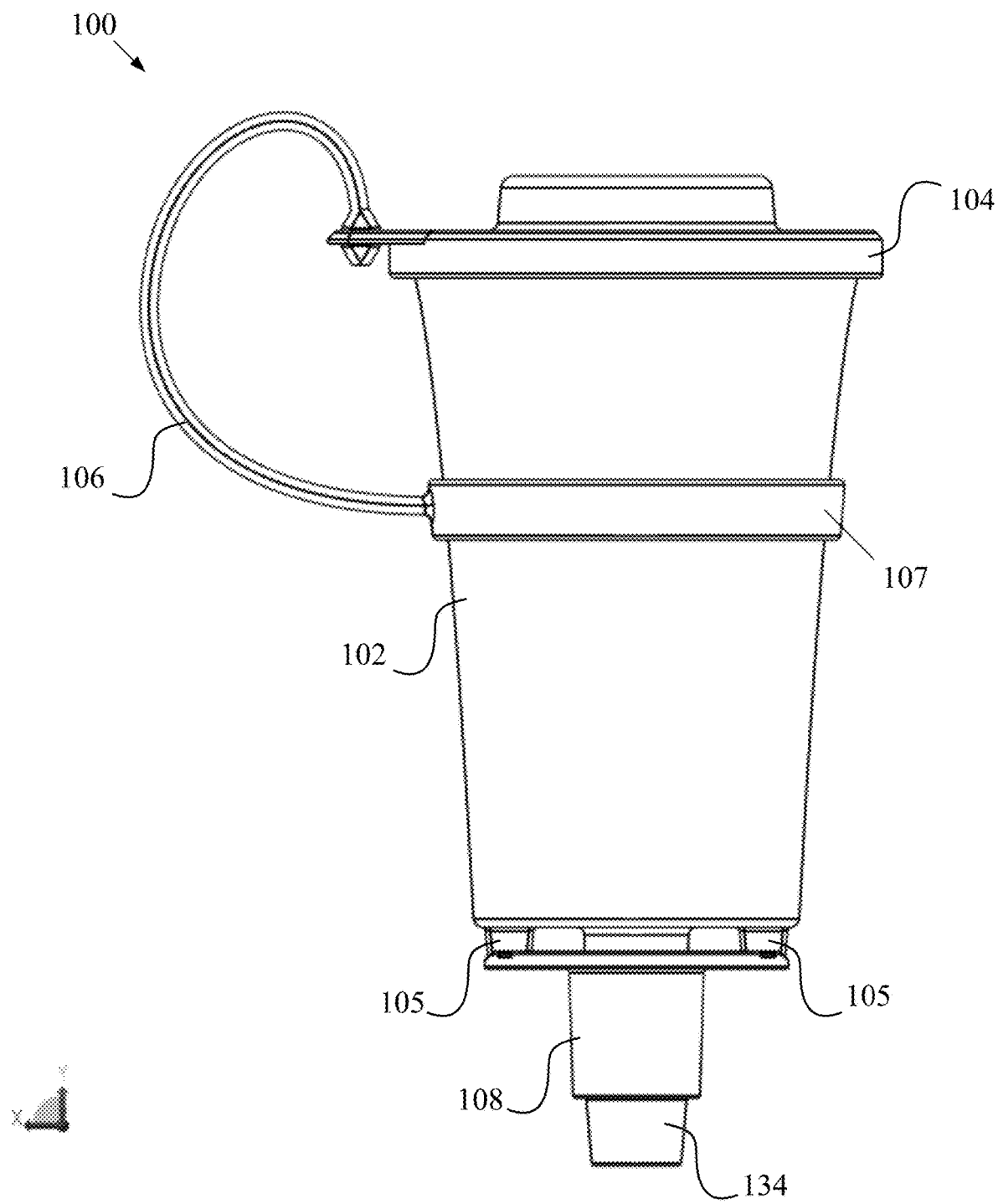
FIG. 6 is an elevational view of a second side of the dispensing apparatus 100.
Figure 7:
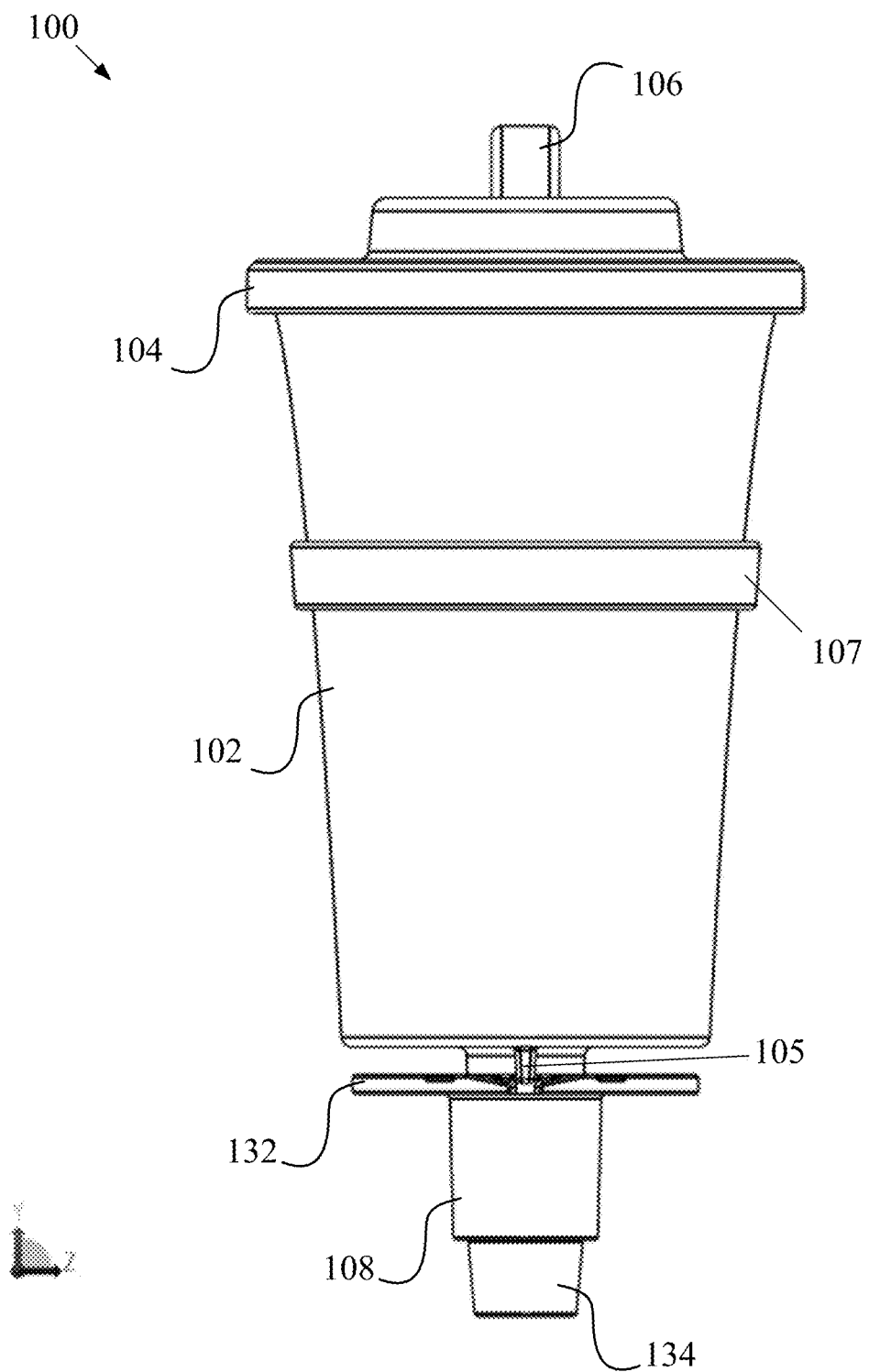
FIG. 7 is an elevational view of a front side of the dispensing apparatus 100.
Figure 8:
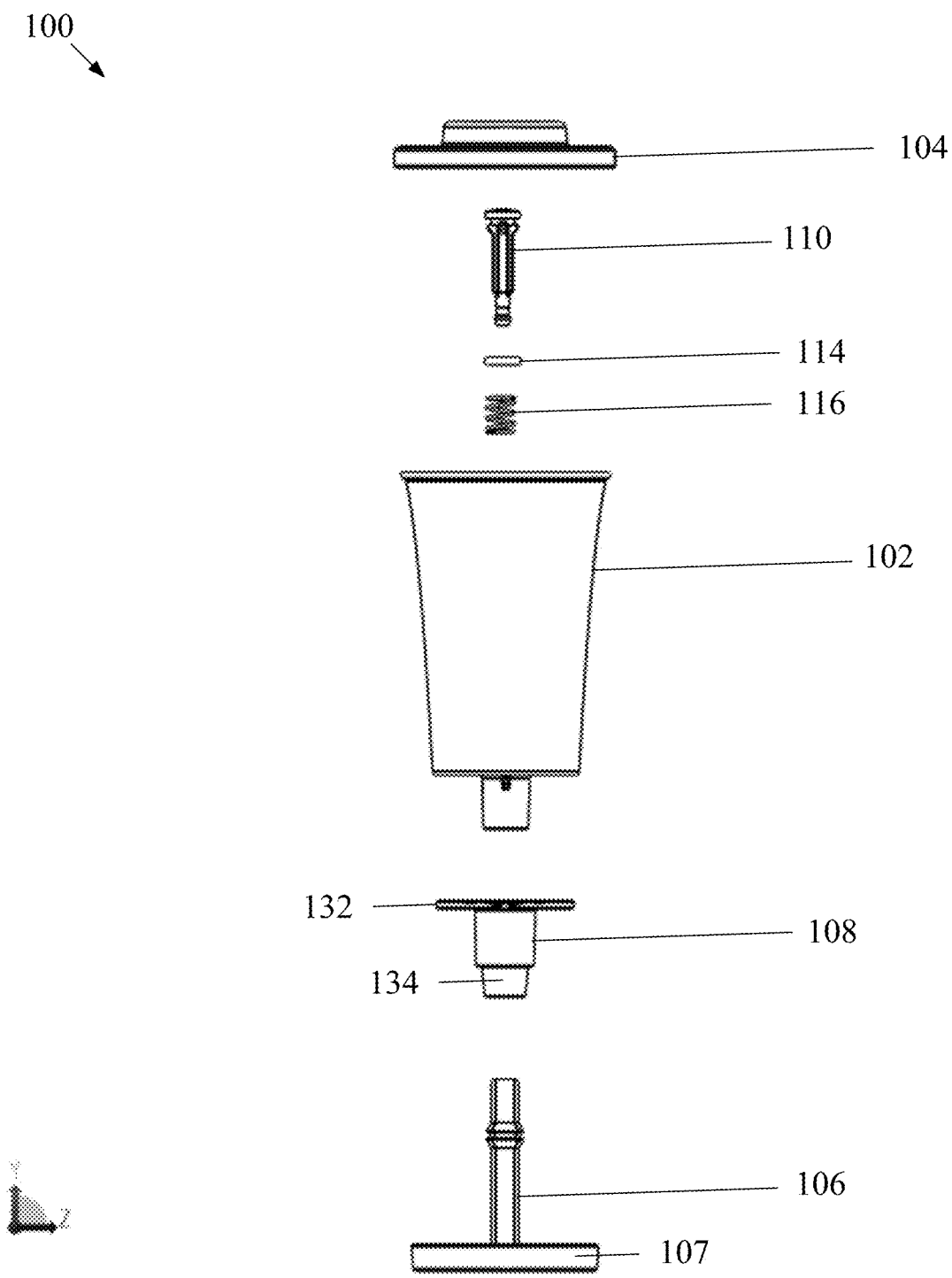
FIG. 8 is an exploded elevational view of the front side of the dispensing apparatus 100.
Figure 9:
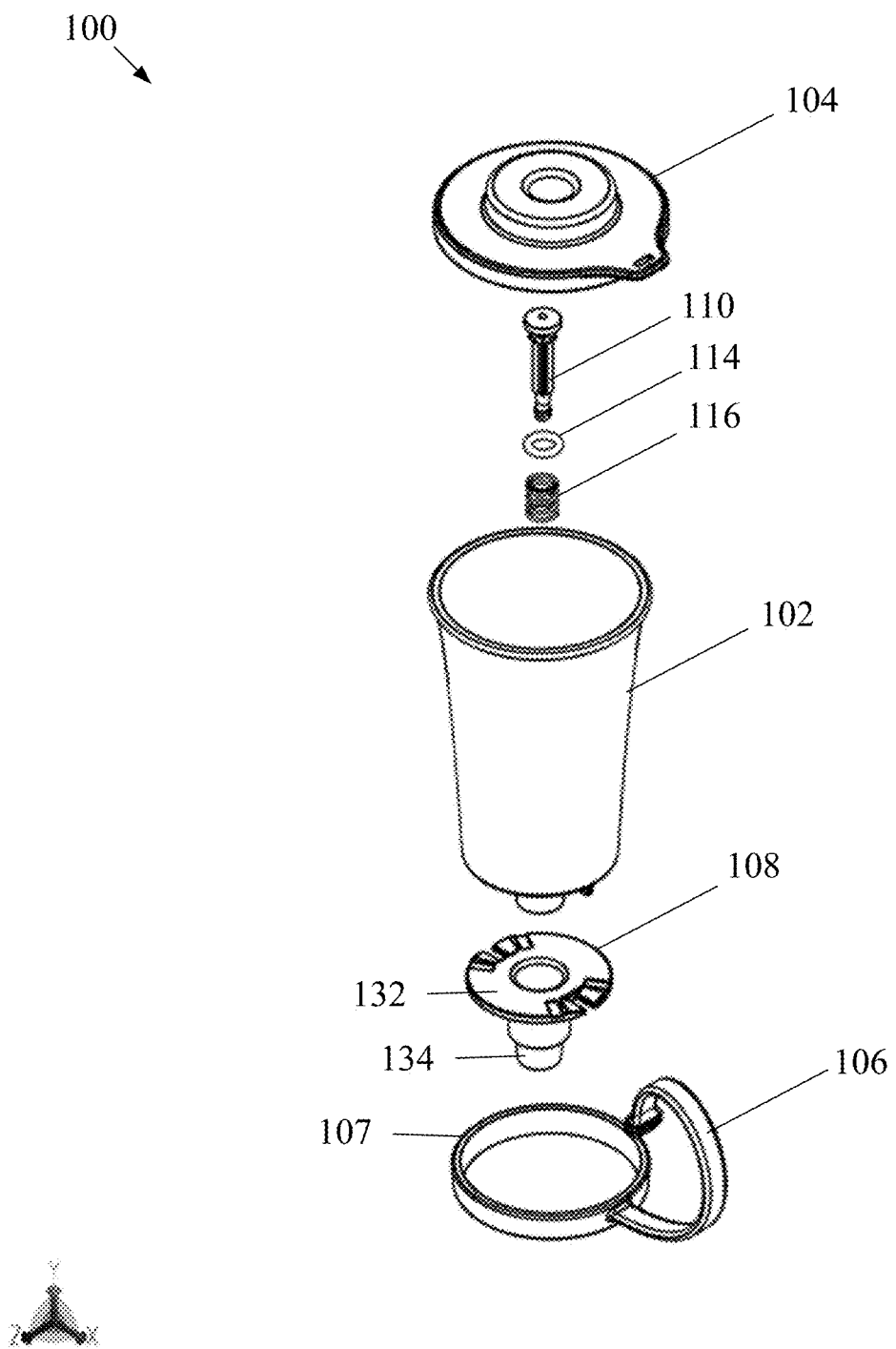
FIG. 9 is an exploded perspective view of the dispensing apparatus 100.

Turning now to FIG. 1, a perspective view of a preferred liquid dispensing apparatus 100 in accordance with one or more aspects and features of the invention is illustrated. Furthermore, FIG. 2 is a top plan view of the dispensing apparatus 100; FIG. 3 is a bottom plan view of the dispensing apparatus 100; FIG. 4 is an elevational view of a first side of the dispensing apparatus 100; FIG. 5 is an elevational view of a rear of the dispensing apparatus 100; FIG. 6 is an elevational view of a second side of the dispensing apparatus 100; and FIG. 7 is an elevational view of a front side of the dispensing apparatus 100. Exploded views of the dispensing apparatus 100 are illustrated in FIG. 8, which is an elevational view of the front side, and in FIG. 9, which is a perspective view thereof.

As seen in these figures, the dispensing apparatus 100 comprises a container 102 with a lid 104 that is retained to the container 102 by a tether 106. The container 102 preferably holds a volume to be dispensed of up to 3 milliliters and is graduated, i.e., marked with units of measurement, by for example units of milliliters or half milliliters (not shown). The container 102 may be transparent, translucent, or opaque.

The container 102 includes a downwardly extending wall portion 103 that define a bottom opening 112 through which a liquid held in the container 102 is dispensed. The wall portion 103 defining the bottom opening of the container 102 is perhaps best seen in FIG. 14, which is a cross-sectional view of just the container 102. Dispensing of the fluid from the container 102 is mechanically controlled by an actuator 108, as described below.

The container 102 further includes downwardly extending tabs 105.

The lid 104 snap-fits onto a rim of the container 102 in covering relation to a mouth 101 of the container 102 so as to seal the top of the container 102. Alternatively, the lid 104 may include threads that mate with threads on the container 102 for screwing of the lid 104 onto the container 102.

The tether 106 is attached to the lid 104 at a distal end of the tether 106 and is attached to the container 102 at a proximal end of the tether 106. The tether may attach to the lid in any conventional manner or the tether may be integrally formed with the lid in a manufacturing process. The tether includes a band portion 107 at a proximal end of the tether 106 by which the tether 106 is attached to the container 102. The band portion 107 is shown as being integrally manufactured with the tether 106 but may alternatively be two pieces connected together. The band portion 107 wraps around a midportion of the container 102 and may be permanently attached to the container 102 or removably attached in a frictional fit on the midportion of the container 102.

Figure 12:
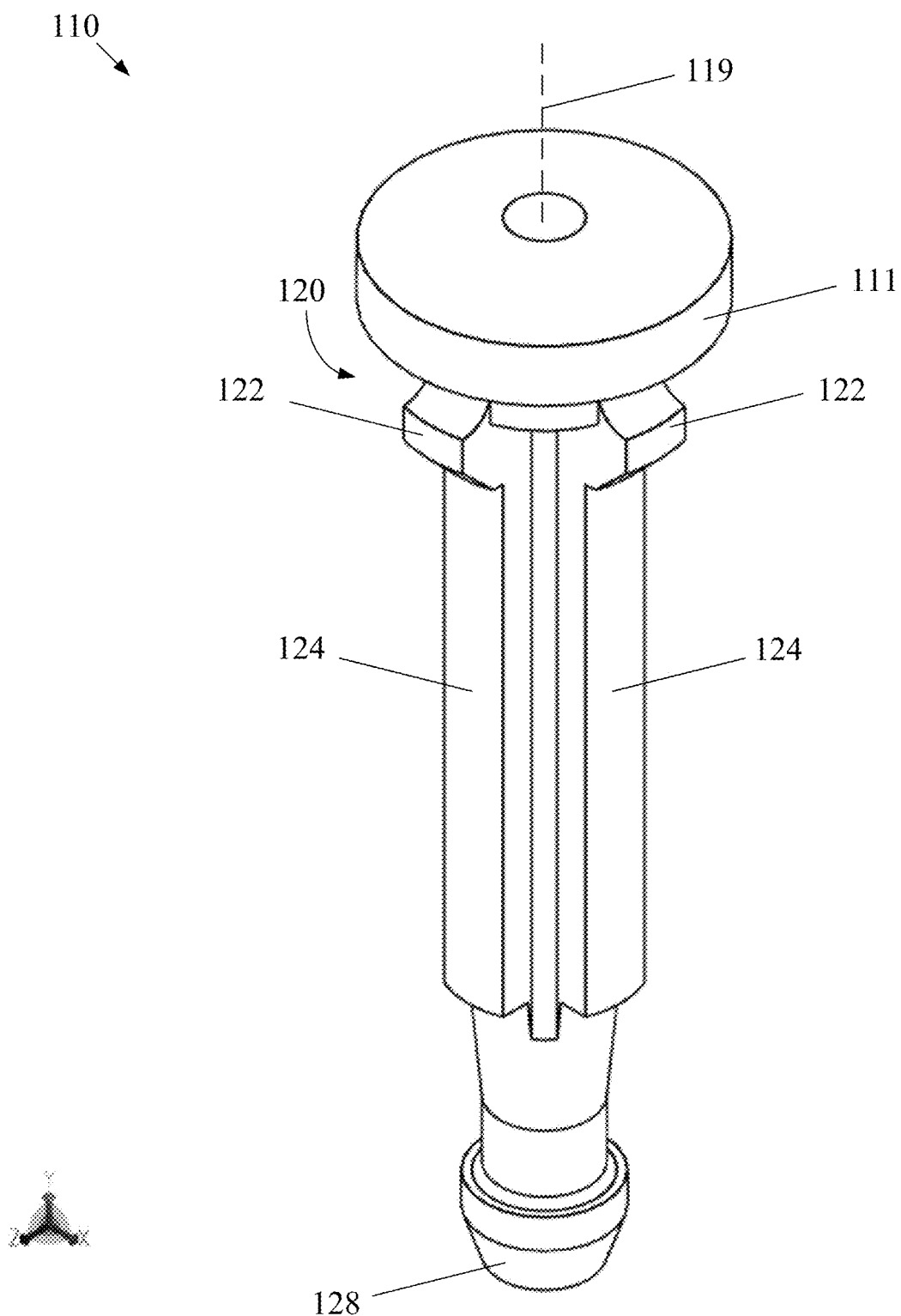
FIG. 12 is a perspective view looking downwardly of a valve 110 of the dispensing apparatus 100.
Figure 13:
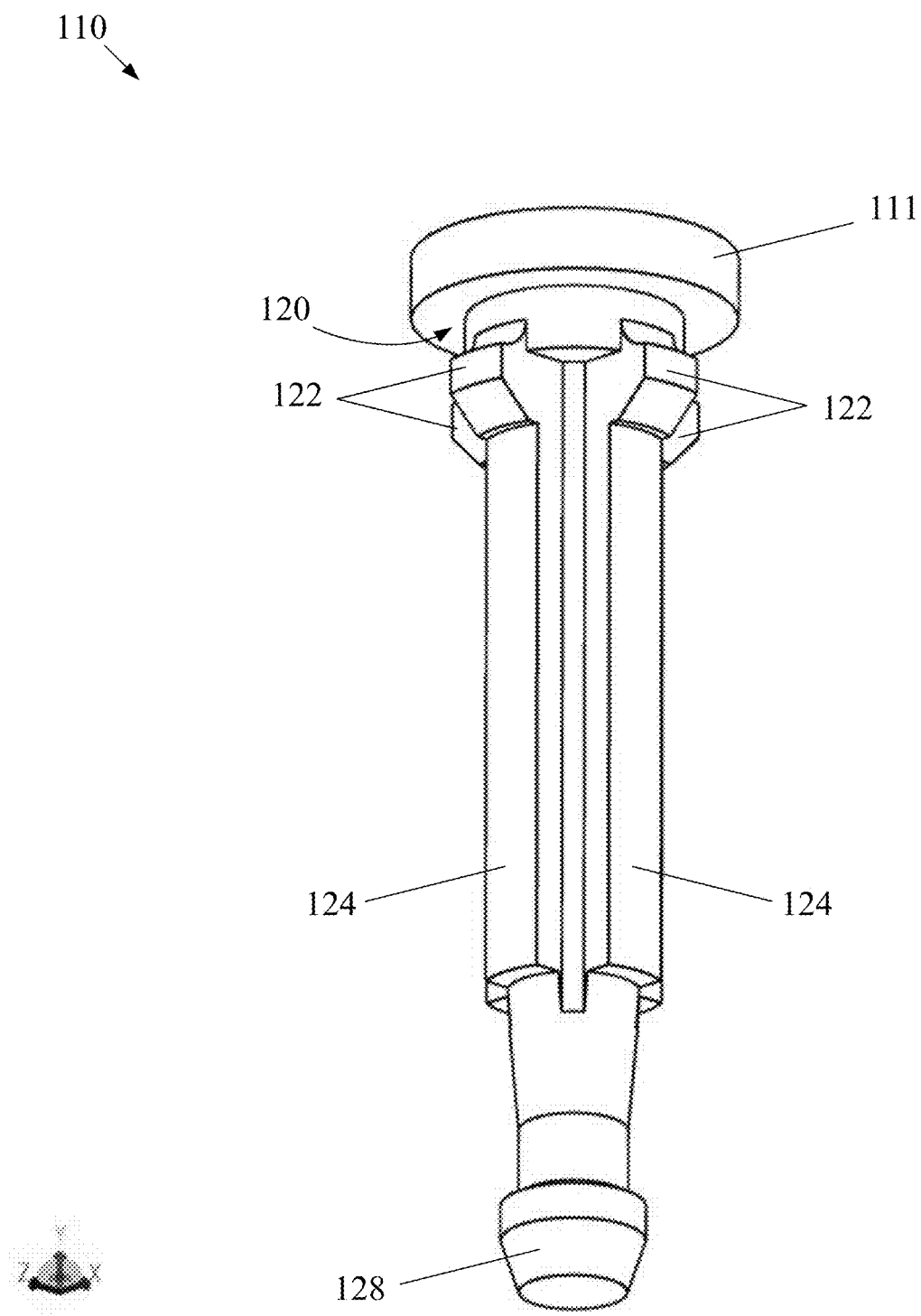
FIG. 13 is a perspective view looking upwardly of the valve 110.
Figure 15:
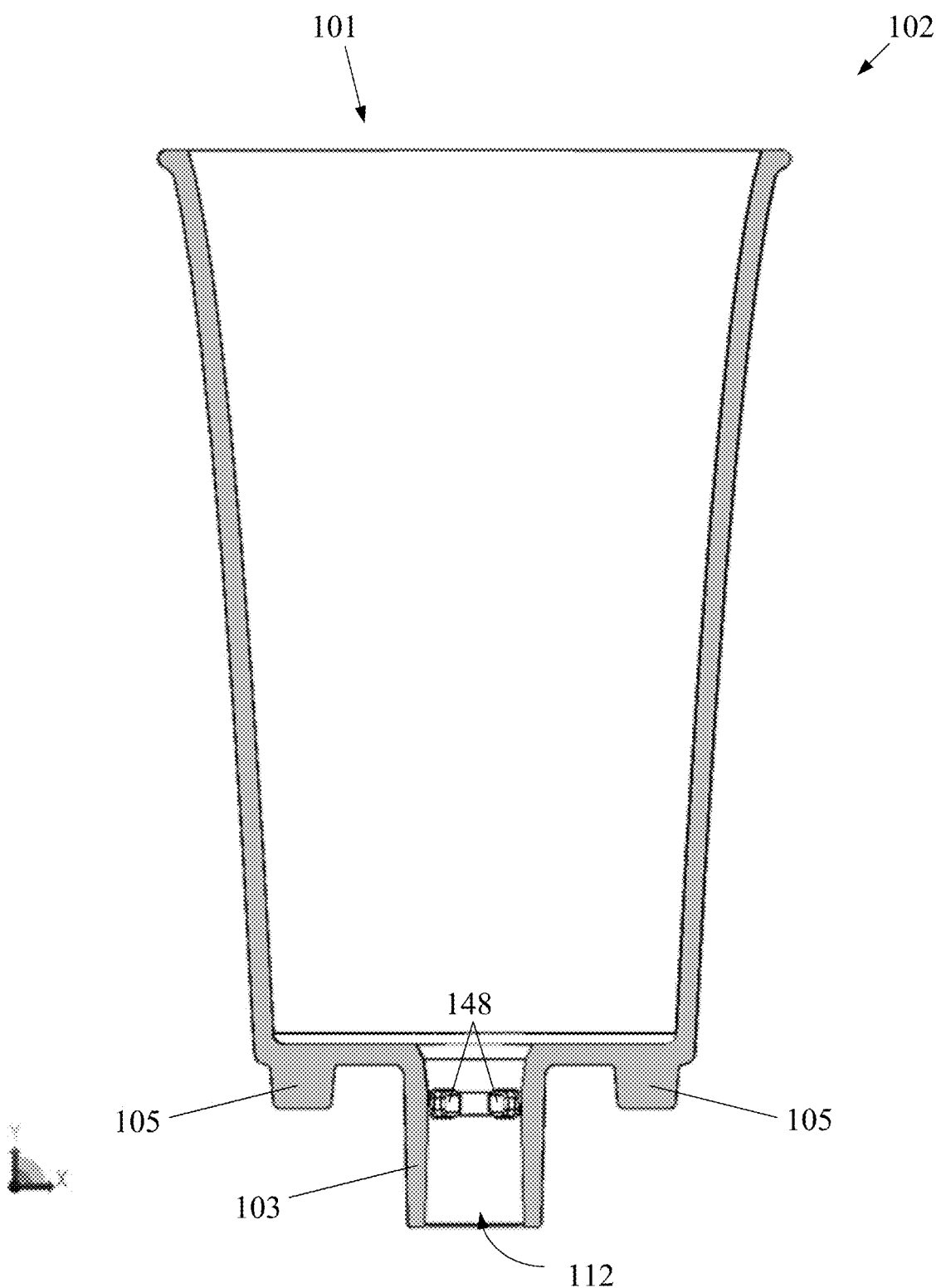
FIG. 15 is a cross-sectional view of the container 102.

With reference to FIGS. 8, 9, 12, 13, and FIG. 15, the dispensing apparatus 100 further includes a valve 110 that controls dispensing of a liquid held in the container 102 through the bottom opening 112. A detailed view of the valve 110 is provided in FIGS. 12 and 13; FIG. 12 is a perspective view looking downwardly of the valve 110, and FIG. 13 is a perspective view looking upwardly of the valve 110. FIG. 15 is a cross-sectional view of the dispensing apparatus 100.

An O-ring 114 seals a head 111 of the valve 110 and the container 102 in a liquid-tight manner for precluding leaking through the bottom opening 112 when the valve 110 is in a closed position. The head 111 of the valve 110 is located at a proximal end of the valve 110, and the O-ring 114 is received within a channel 120 defined between the head 111 and shoulder 122; the valve 110 includes four shoulders 122 arranged equidistant around a longitudinal axis 119 of the valve 110 for retaining the O-ring 114 adjacent the head 111. The valve 110 further includes alignment ribs 124; the valve 110 includes four ribs 124 arranged equidistant around the longitudinal axis 119 of the valve 110.

A distal end of the valve 110 is configured for attachment of the actuator 108, whereby the valve 110 is mechanically actuated by the actuator 108. Specifically, the distal end of the valve 110 includes a bulbous portion 128. The actuator 108 clutches onto the distal end of the valve 110 and is retained there by the bulbous portion 128, as described below.

A spring 116 extends between the actuator 108 and the container 102 and is tensioned to bias the actuator 108 in a downward direction away from the container 102 and, consequently, thereby biases the valve 110 into the closed position sealing off the liquid in the container from the bottom opening 112 of the container 102.

Figure 10:
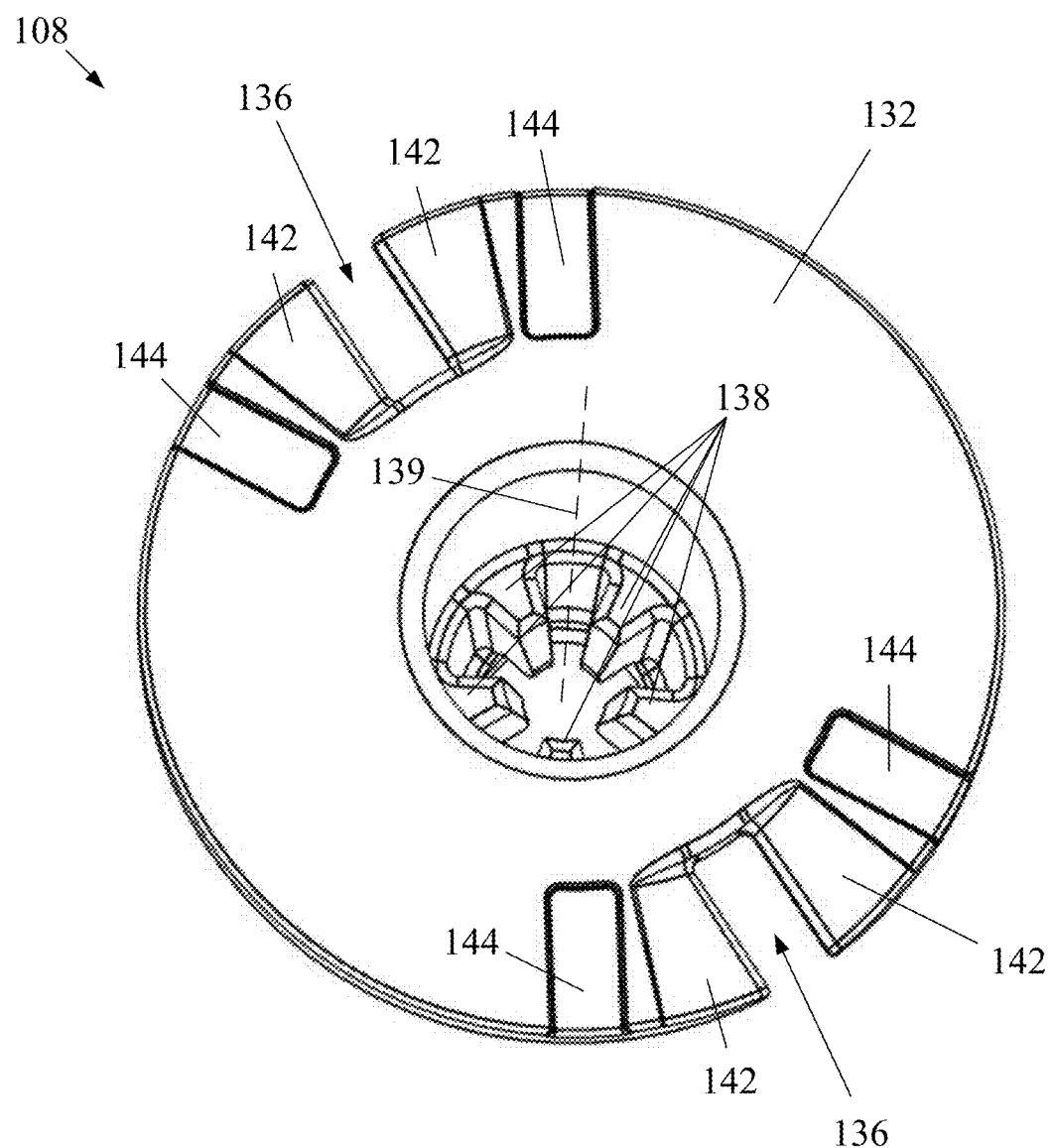
FIG. 10 is a perspective view of a top of an actuator 108 of the dispensing apparatus 100.
Figure 10:
Figure 11:
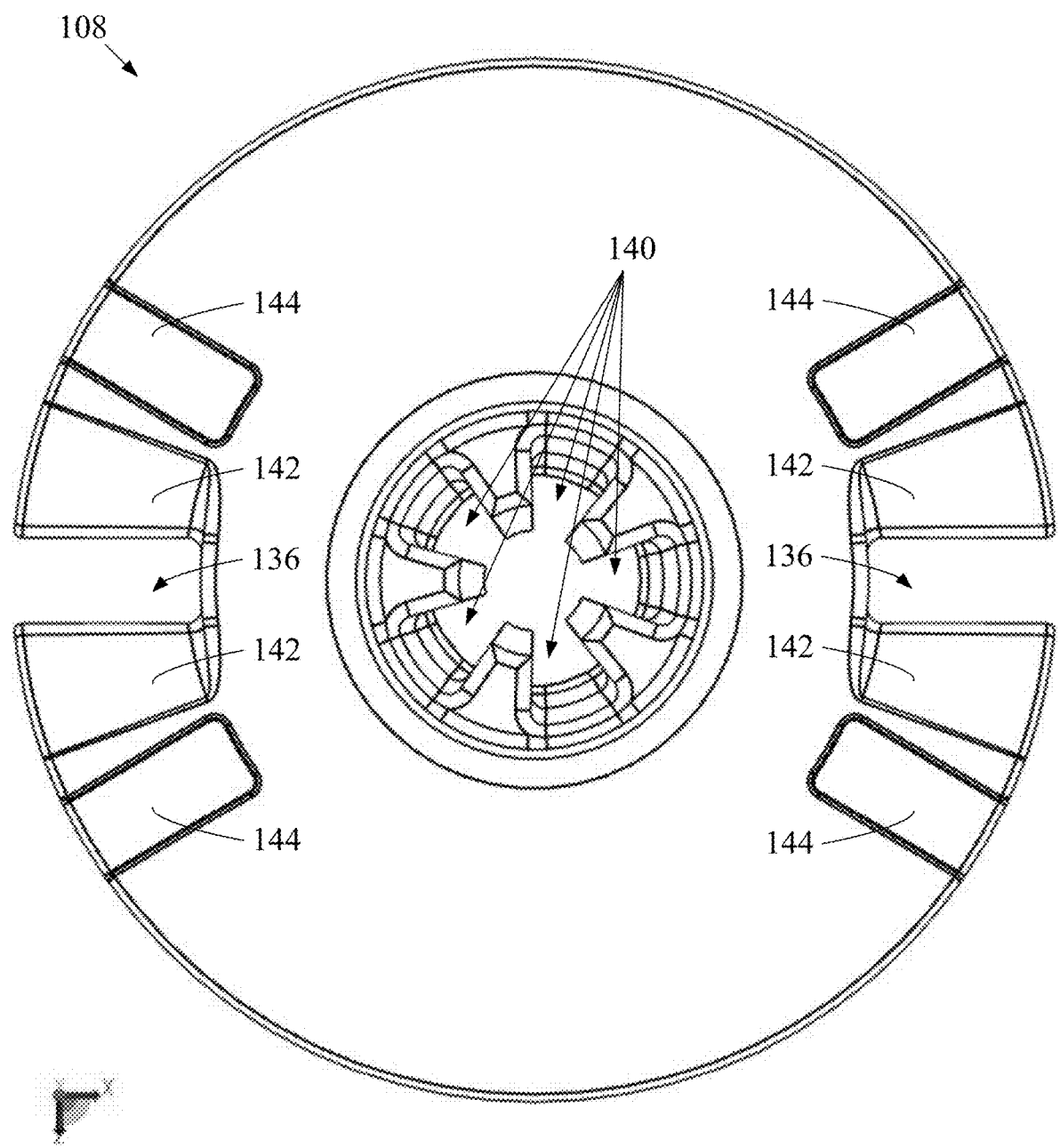
FIG. 11 is a top plan view of the actuator 108.

A detailed view of the actuator 108 is provided in FIGS. 10 and 11; FIG. 10 is a perspective view of a top of the actuator 108, and FIG. 11 is a top plan view of the actuator 108. The actuator comprises a downwardly extending portion 134 defining a funnel and an annular portion 132. On an inside of the downwardly extending portion 134, the actuator 108 comprises a plurality of radially extending fingers 138 that extend toward an axis of the actuator 139. The fingers 138 collectively define an area between the ends thereof that is dimensioned to receive therethrough the distal end of the valve 110 and, specifically, the bulbous portion 128.

Figure 16:
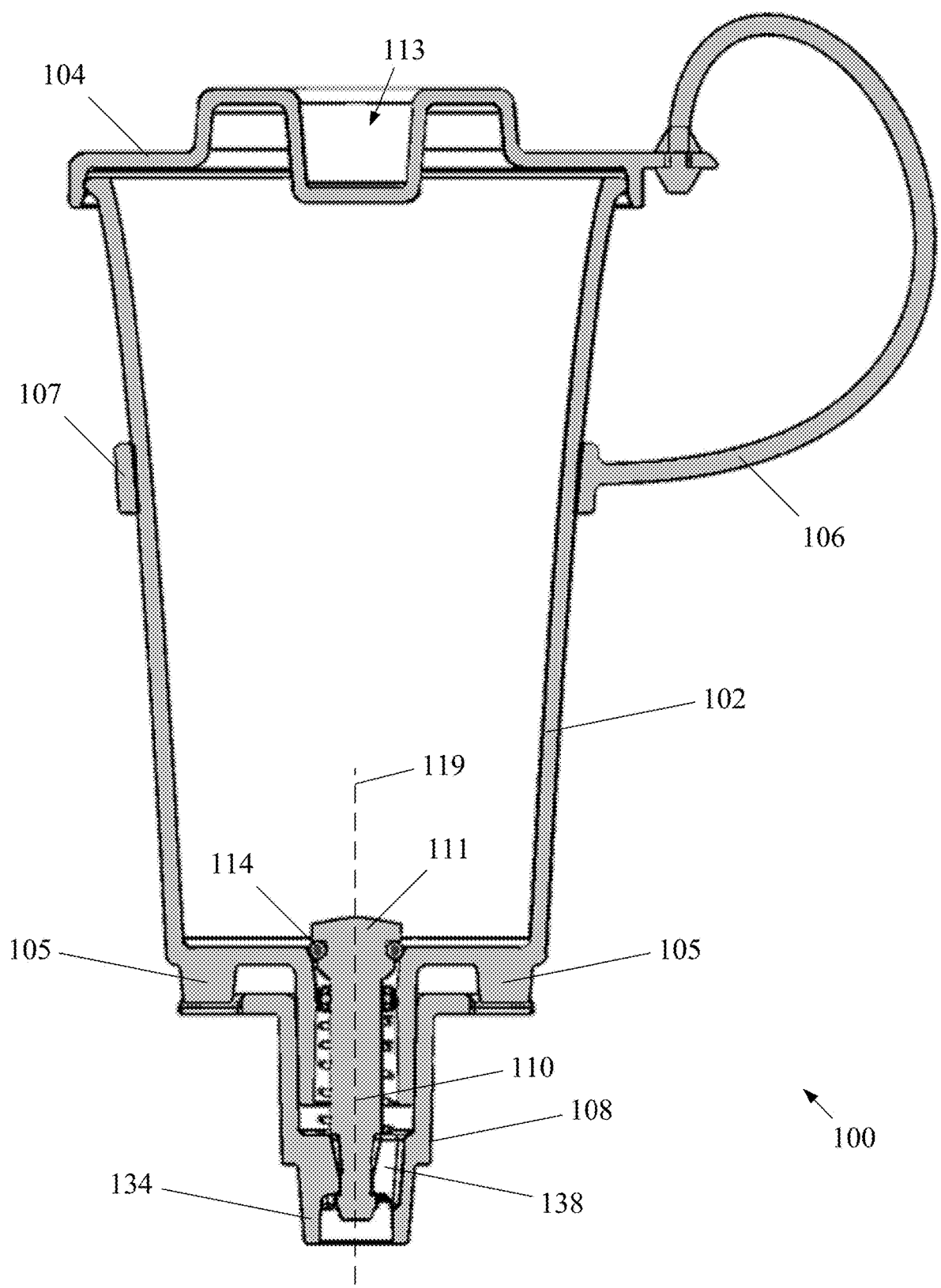
FIG. 16 is a cross-sectional view of the dispensing apparatus 100.

In passing the bulbous portion 128 through the area, the portion 128 engages the ends of the fingers 138 and the bulbous portion 128, the fingers 138, or both flex to a sufficient extent so as to allow the bulbous portion 128 to pass by the fingers 138 with minor force and without damaging either. The actuator 108 thereby snaps or pops onto the distal end of the valve 110 and is retained thereon. The portion of the valve 110 to which the fingers 138 come to engage preferably are shaped and dimensioned to receive and retain the fingers, as illustrated in FIG. 16 for example. This fixes the actuator 108 and to the valve 110 relative to axial movement along axis 119; the actuator 108 and valve 110 are in fixed disposition relative to each other when moving toward and away from the container 102.

Moreover, the actuator 108 while retained on the distal end of the valve is nonetheless rotatable about the axis 119 and axis 139. Fluid passageways 140 also are defined between the fingers 138, as perhaps best illustrated in FIG. 11, whereby a liquid may flow through the downwardly extending portion 134 and around the bulbous portion 128 even while the actuator 108 is attached on the distal end of the valve 110.

The annular portion 134 is located proximate and underlies the bottom of the container 102. The dispensing apparatus 100 is configured such that the actuator 108 is rotatable with the tabs 105 riding up inclined surfaces 142 to detents 144 formed in the annular portion 132 in which detents 144 the ends of the tabs 105 are received and retained. Furthermore, when the ends of the tabs 105 are received and retained in the detents 144, the valve 110 is biased by the spring in the closed position. This serves to lock the valve in the closed position.

To open the valve 110 for dispensing of fluid in the container 102, the actuator 108 is moved away from the container 102 such that the ends of the tabs 105 are withdrawn from the detents 144, the actuator 108 then is rotated such that the tabs align with the openings 136 formed in the annular portion 134, and the actuator 108 is moved toward the container 102 in opposition to the spring biasing. In moving the actuator 108 toward the container 102, the tabs pass through the openings 136. Moreover, because the actuator is mounted to the distal end of the valve 110, such movement extends the head 111 of the valve 110 into the containment space of the container 102 thereby unsealing the bottom opening 112 and enabling fluid to flow from the container 102 through the bottom opening 112.

Figure 14:
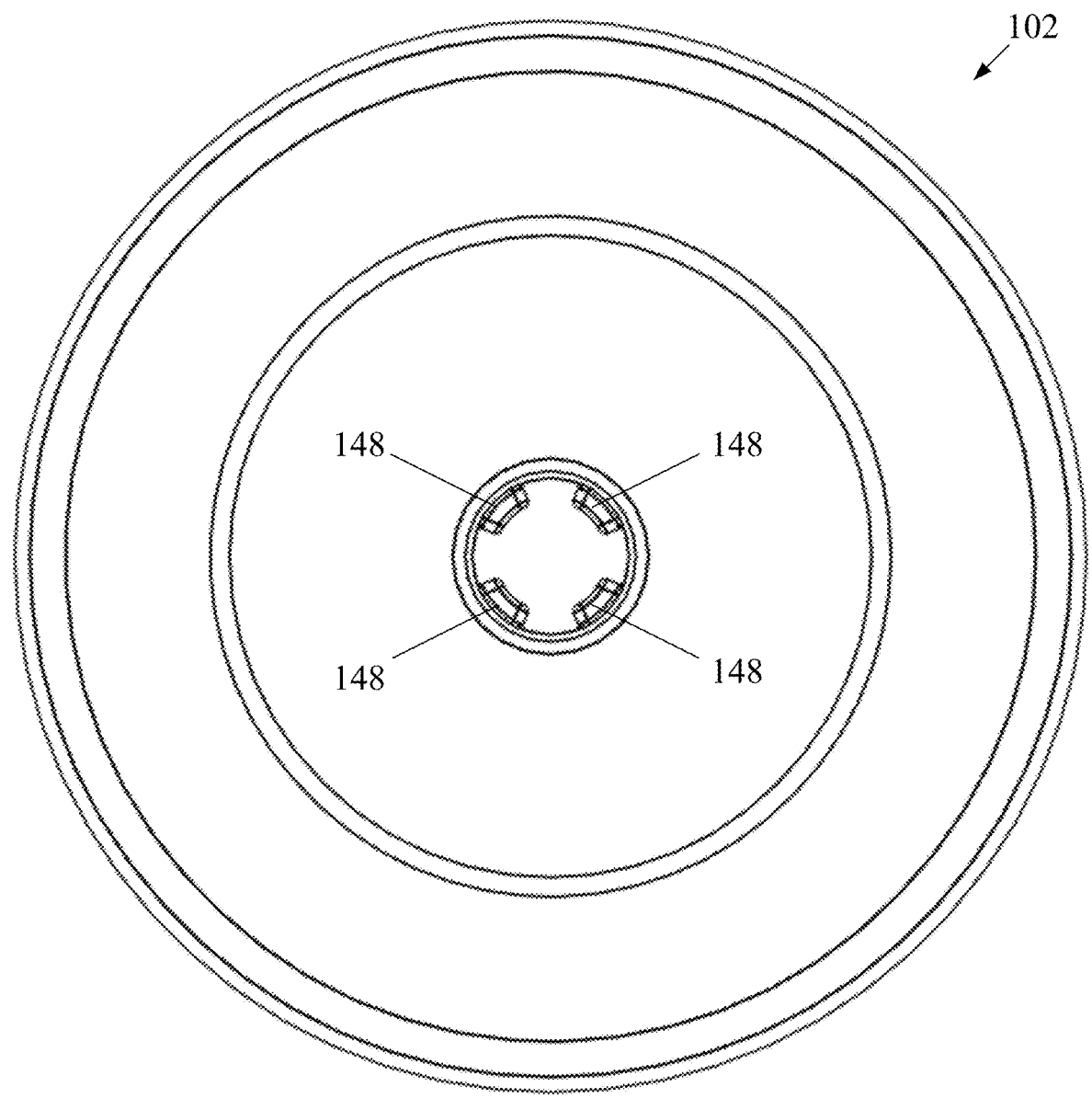
FIG. 14 is a top plan view of the container 102 of the dispensing apparatus 100.

FIG. 14 is a top plan view of the container 102. As illustrated in FIG. 14, the container 102 defines alignment ribs 148 on an inside of the wall portion 103. The alignment ribs 124 on the valve 110 and the alignment ribs 148 complement each other such that the distal end and mid portion of the valve 110 passes through the bottom opening 112 in the container 102 and is retained therein against rotation about the axis 119 of the valve when the dispensing apparatus 100 is in the assembled state. Preferably there is little room or space between the alignment ribs 103,148 for a rotation-free fit.

FIG. 15 is a cross-sectional view of the container 102 of the dispensing apparatus 100.

FIG. 16 is a cross-sectional view of the dispensing apparatus 100. FIG. 16 perhaps best illustrates a recess 113 that is formed in the lid 104, wherein the recess 113 is shaped and dimensioned to receive in frictional fit therein the funnel-shaped, downwardly extending wall portion 134 of the actuator 108. This enables the container 102 to be placed and maintained in an upright position on a table surface without using one's hand to maintain the container 102; in this respect, it is free standing. Both hands thus can be used for pouring of a liquid into the container 102.

Figure 17:
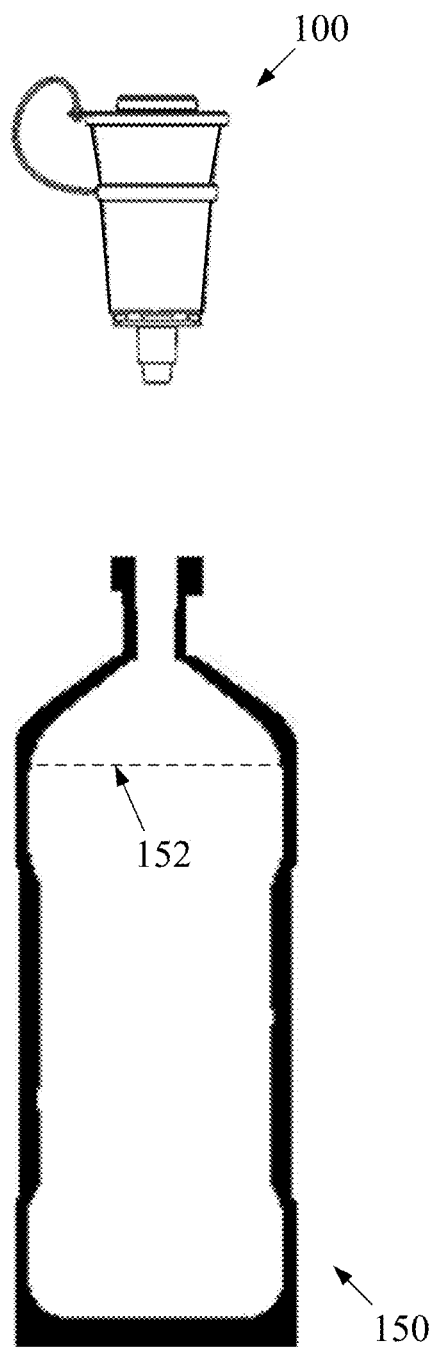
FIGS. 17-19 illustrate a method of using the dispensing apparatus 100 in accordance with one or more aspects and features of the invention.
Figure 18:
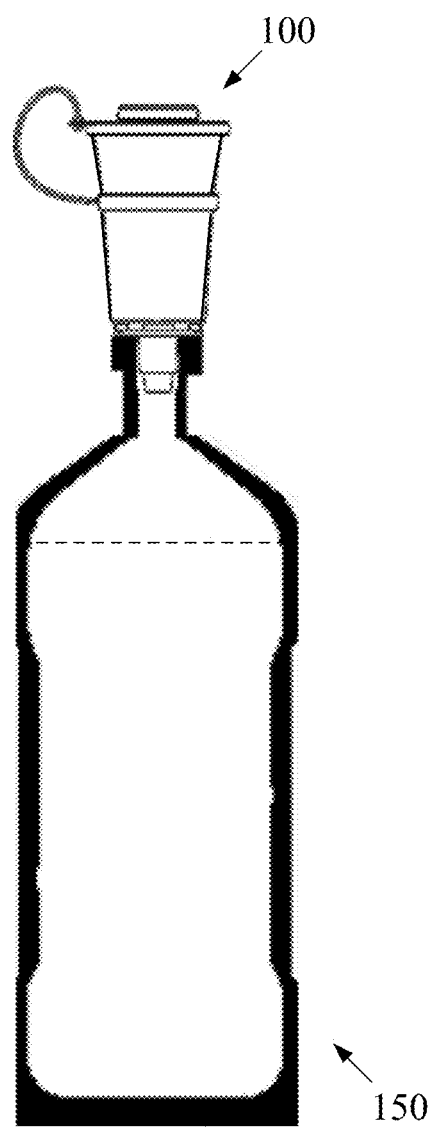
Figure 19:

Use of the dispensing apparatus 100 to add a liquid from the container to a second liquid in a bottle 150 is collectively illustrated in FIGS. 17, 18, and 19. It is contemplated that the bottle 150 also could be—and hereby additionally represents—a container in the form of a can.

As illustrated in FIG. 17, the second liquid has a liquid level at 152 such that there is sufficient capacity remaining in the bottle 150 to add the liquid from the container of the dispensing apparatus 100. The dispensing apparatus is unlocked (if locked) by rotating the actuator such that the openings in the annular portion align with the locking tabs extending downwardly from the container. The apparatus then is positioned with the funnel-shaped, downwardly extending wall portion of the actuator extending into the mouth and neck of the bottle 150, as illustrated in FIG. 18.

As illustrated in FIG. 18, the annular portion of the actuator abuts the rim of the bottom 150 but has yet to be displaced toward the container of the apparatus. As such, no liquid has yet been dispensed from the apparatus 100 into the bottle. Further pressing of the container downwardly (depressing the container relative to the actuator and bottle) results in displacement of the actuator toward the container, counter to the biasing of the spring of the apparatus 100. This unseats the head of the valve, resulting in fluid flow around the valve head and through the fluid passageways of the actuator, and dispensing into the interior of the bottle 150 for mixing with the liquid already in the bottle 150 and raising the fill level, as shown in FIG. 18.

FIGS. 20, 21, and 22 of U.S. patent application publication 2023/0371731 ("the Application Publication"), hereby incorporated herein by reference, are perspective views of a working prototype of a dispensing apparatus in accordance with one or more aspects and features of the invention. The dispensing apparatus is illustrated in FIG. 20 of the Application Publication in a sealed and locked condition suitable for storing and carrying liquid in the container for later use. FIG. 21 of the Application Publication illustrates a top of the dispensing apparatus including recess formed in the lid. The recess of the lid is configured to receive the funnel-shaped, downwardly extending wall portion of the actuator for handsfree standing of the apparatus, which is illustrated in FIG. 22 of the Application Publication.

Of course, the liquid in the container can also be dispensed by manually pressing the actuator toward the container to unseat the valve. The liquid in the container can also be poured from the container rather than dispensed through the bottom opening, if desired.

In view of the foregoing, it will be appreciated that the "means for dispensing a liquid" comprises the spring-biased valve and may further include the actuator; the "means for positioning the apparatus for filling" comprises the funnel-shaped, downwardly extending portion thereof and the lid thereof having the recess within which the funnel-shaped, downwardly extending portion is positioned in frictional fit when the lid is placed on a surface, whereby the apparatus is free standing; and the "means for locking the apparatus" comprises the spring-biased tabs and detents.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A liquid dispensing apparatus, comprising:
   (a) a container including a downwardly extending wall portion that defines a bottom opening through which a liquid in the container is dispensed;
   (b) a valve;
   (c) an actuator connected to the valve for controlling dispensing of the fluid from the container, the actuator being movable along an axis between a dispensing position, in which liquid from the container is dispensed, the valve being open when the actuator is in the dispensing position, and a non-dispensing position, in which liquid from the container is not dispensed, the valve being closed when the actuator is in the non-dispensing position, and the actuator in the non-dispensing position being located further from the container than when in the dispensing position; and
   (d) a spring biasing the actuator in a direction away from the container;
   (e) wherein the liquid dispensing apparatus further comprises a locking mechanism for precluding the actuator from transitioning from the non-dispensing position toward the dispensing position; and
   (f) wherein the locking mechanism comprises downwardly extending tabs that engage an annular portion of the actuator and block displacement of the actuator from the non-dispensing position toward the container;
   (g) wherein the actuator includes openings for accommodating passage therethrough of the tabs; and
   (h) wherein the actuator is rotatable about the axis between an unlocked position in which the openings are aligned with the tabs and an unlocked position in which the tabs are aligned with the openings.

2. The liquid dispensing apparatus of claim 1, further comprising an O-ring for sealing engagement between the valve and the container.

3. The liquid dispensing apparatus of claim 1, further comprising a lid that snap-fits or screws onto a rim of the container in covering relation to a mouth of the container so as to seal the top of the container.

4. The liquid dispensing apparatus of claim 3, wherein the lid is retained to the container by a tether.

5. A liquid dispensing apparatus, comprising:
   (a) a container including a downwardly extending wall portion that defines a bottom opening through which a liquid in the container is dispensed,
   (b) a valve,
   (c) an actuator connected to the valve for controlling dispensing of the fluid from the container, the actuator being movable along an axis between a dispensing position, in which liquid from the container is dispensed, the valve being open when the actuator is in the dispensing position, and a non-dispensing position, in which liquid from the container is not dispensed, the valve being closed when the actuator is in the non-dispensing position, and the actuator in the non-dispensing position being located further from the container than when in the dispensing position, and
   (d) a spring biasing the actuator in a direction away from the container,
   (e) wherein the actuator comprises a funnel-shaped, downwardly extending wall portion for insertion into a mouth of a bottle in which the liquid is to be dispensed from the container,
   (f) wherein the liquid dispensing apparatus further comprises a lid that covers a mouth of the container so as to seal the top of the container, and
   (g) wherein the lid includes a recess configured to receive and retain in frictional fit the funnel-shaped, downwardly extending wall portion of the actuator.

6. The liquid dispensing apparatus of claim 5, wherein the funnel-shaped wall portion defines an interior space within which is received the downwardly extending wall portion defining the bottom opening in the container.

7. The liquid dispensing apparatus of claim 5, further comprising an O-ring for sealing engagement between the valve and the container.

8. The liquid dispensing apparatus of claim 5, further comprising a lid that snap-fits or screws onto a rim of the container in covering relation to a mouth of the container so as to seal the top of the container.

9. The liquid dispensing apparatus of claim 8, wherein the lid is retained to the container by a tether.

10. An apparatus comprising means for dispensing a liquid, means for positioning the apparatus for filling, and means for locking the apparatus so that the liquid is not accidentally dispensed, wherein the means for positioning the apparatus for filling comprises a funnel-shaped, downwardly extending portion of a container of the apparatus and a lid of the apparatus having a recess within which the funnel-shaped, downwardly extending portion is positioned in frictional fit when the lid is placed on a surface.

11. The apparatus of claim 10, wherein the means for dispensing a liquid comprises a spring-biased valve and an actuator, displacement of which actuates the valve.

12. An apparatus comprising means for dispensing a liquid, means for positioning the apparatus for filling, and means for locking the apparatus so that the liquid is not accidentally dispensed, wherein the means for locking the apparatus comprises spring-biased tabs of a container that are received within detents of an actuator.

13. The apparatus of claim 12, wherein the means for dispensing a liquid comprises a spring-biased valve and an actuator, displacement of which actuates the valve.

\* \* \* \* \*